United States Patent [19]

Woodward

[11] Patent Number: 4,992,998

[45] Date of Patent: * Feb. 12, 1991

[54] ACOUSTIC RANGE FINDING SYSTEM

[75] Inventor: Steven J. Woodward, Port Hope, Canada

[73] Assignee: Federal Industries Industrial Group Inc., Toronto, Canada

[*] Notice: The portion of the term of this patent subsequent to Dec. 26, 2006 has been disclaimed.

[21] Appl. No.: 406,283

[22] Filed: Sep. 12, 1989

Related U.S. Application Data

[63] Continuation-in-part of Ser. No. 190,391, May 5, 1988, Pat. No. 4,890,266, which is a continuation-in-part of Ser. No. 41,877, Apr. 22, 1987, Pat. No. 4,831,565, which is a continuation-in-part of Ser. No. 916,013, Oct. 3, 1986, Pat. No. 4,821,215.

[51] Int. Cl.$^5$ ............................................. G01S 15/08
[52] U.S. Cl. ....................................... 367/99; 367/98; 367/901; 367/908; 73/290 V; 340/627; 364/561
[58] Field of Search ................... 367/99, 98, 901, 908; 364/561, 572, 574, 724.01; 340/621; 73/290 V

[56] References Cited

U.S. PATENT DOCUMENTS

| | | | |
|---|---|---|---|
| 3,102,261 | 8/1963 | Wippert | 367/900 |
| 3,787,802 | 1/1974 | Brahman | 367/95 |
| 3,896,411 | 7/1975 | Mackey et al. | 367/901 |
| 3,944,965 | 3/1976 | Caporin et al. | 367/98 |
| 4,000,650 | 1/1977 | Synder | 367/908 |
| 4,396,268 | 8/1983 | Shenk | 354/195.1 |
| 4,596,144 | 6/1986 | Panton et al. | 73/290 V |
| 4,821,215 | 4/1989 | Woodward | 367/908 |
| 4,831,565 | 5/1989 | Woodward | 367/99 |
| 4,890,266 | 12/1989 | Woodward | 367/99 |

FOREIGN PATENT DOCUMENTS

| | | |
|---|---|---|
| 0156636 | 3/1985 | European Pat. Off. . |
| 0174090 | 7/1985 | European Pat. Off. . |
| 0260113 | 9/1987 | European Pat. Off. . |
| 0262990 | 4/1988 | European Pat. Off. . |
| 3418486 | 1/1986 | Fed. Rep. of Germany . |
| 2394811 | 1/1979 | France . |

OTHER PUBLICATIONS

"Donar: A Computer Processing System to Extend Ultrasonic Pulse-Echo Testing" Lees et al., Ultrasonics, Jul. 1973, pp. 165-173.

Primary Examiner—Thomas H. Tarcza
Assistant Examiner—Daniel T. Pihulic
Attorney, Agent, or Firm—Ridout & Maybee

[57] ABSTRACT

In acoustic level sensing apparatus, in which pulses of acoustic energy are transmitted by an electrically energized transducer towards a surface to be sensed, and the electrical output from the transducer following the pulse is digitized and analyzed to detect a return echo from the surface, so as to produce a digitized echo profile. The digtized echo profile is enhanced by removing narrow peaks likely to correspond with certain types of spurious echo, and narrow valleys which may represent fragmentation of a wanted echo. Echoes are identified by comparing the profile with a time varying threshold generated derived from a linear regression performed on part of the threshold, various different types of comparison being performed and their results combined prior to selecting the most likely true echo on the basis of the combined results.

9 Claims, 9 Drawing Sheets

ACOUSTIC RANGE FINDING SYSTEM

REFERENCE TO RELATED APPLICATION

This application is a continuation-in-part of my copending application Ser. No. 190,391, filed May 5, 1988, now U.S. Pat. No. 4,890,266 issued Dec. 26, 1989, which is a continuation-in-part of my application Ser. No. 041,877 filed Apr. 22, 1987, now U.S. Pat. No. 4,831,565 issued May 16, 1989, which is continuation-in-part of my application Ser. No. 916,013, filed Oct. 3, 1986, now U.S. Pat. No. 4,821,215, issued Apr. 11, 1989.

BACKGROUND OF THE INVENTION

1. Field of the Invention

This invention relates to acoustic range finding systems of the type in which an electro-acoustic transducer transmits a pulse of acoustic energy towards a surface whose distance is to be measured, and subsequent signals received from the transducer are monitored to determine the temporal location of an echo from that surface.

2. Review of the Art

In practice, problems arise in resolving the wanted true echo from other signals produced by the transducer or its connections. U.S. Pat. No. 4,596,144 of which I am coinventor, describes methods of detecting a true echo in an ultrasonic range finding system which are essentially of a statistical nature, and not only identify an echo resulting from a particular shot but are capable of quantifying the degree of assurance that a selected echo is a true echo. This latter information may be utilized in determining whether additional shots are required to provide reliable data.

All of the echo extraction techniques described in U.S. Pat. No. 4,596,144 have the following steps in common:

1. An echo profile is formed by taking one or more shots, i.e., applying transmit pulses to the transducer, and recording a series of digitized samples of the received signal to form a data base characterizing the echo profile.
2. The first part of the echo profile is blanked in order to cover over the transmit pulse and some transducer ringing. In order to obtain acceptable efficiency, the transducer must have a reasonably high quality factor or Q, and this results in an exponentially decaying oscillation of the transducer which continues after the end of the transmit pulse and initially forms the major portions of the transducer output to a receiver which processes the transducer output. Although the start of the echo profile coincides with the start of the transmit pulse, the useful echo information occurs after the end of blanking.
3. A reference curve is formed. The curve starts at a fixed start point and then follows the profile.
4. The most probably correct echo is selected by comparing the echo profile with the reference curve.

Certain problems arise in the application of these techniques.

Firstly, it is desirable to set the start point of the reference curve low in order to confidently detect valid close-in echoes. On the other hand it is desirable to set the start point high so that the reference curve will clear the unblanked portion of the transducer ringing following the blanked portion, otherwise the ringing may be deemed to be the correct echo.

In the apparatus described in U.S. Pat. No. 4,596,144, the start point may be set manually by entering a value from the keyboard, or automatically. To set the start point automatically, the operator must first ensure that the material level is well down from the transducer, and then by use of the keyboard instruct the computer to calculate a start point which will cause the reference curve to clear the transducer ringing following the blanking interval. The start point cannot be set with a full bin because the valid closein echo may appear to be transducer ringing and the start point would be set high to clear this echo, with resultant detection of a spurious echo.

A further problem arises because of variations in transducer ringing. The ringing may increase for the following reasons:

1. An increase or decrease in temperature.
2. A change in the mounting of the transducer; for example, the mounting bolts of the transducer may be tightened.
3. Natural aging of the transducer.
4. Replacement of the transducer.

The operator must recognize these factors and set the start point high enough to clear the worst case of expected ringing. If the start point is too high then valid close-in echoes will not be detected. If the start point is set too low then the apparatus may initially operate correctly, but a change of season will probably cause an increase in ringing and the start point must then be increased. If a compromise cannot be achieved then the blanking interval must be increased so that less of the ringing is seen. The disadvantage of increasing the blanking is that levels in the top portion of the bin cannot be measured, and the useful height of the bin is thus reduced.

In transmitter design a trade off is made in selecting the transmit pulse width. A narrow pulse width has the effect of shifting the ringing to the left, when viewed graphically, simply because the end of transmission occurs sooner. The position of the echo remains the same and therefore close-in echoes will stand out more above the ringing. A wide transmit pulse has the effect of producing the largest possible return echo, even in the presence of air currents which tend to disperse the sound wave, as often happens with distant targets.

Much effort has been directed to improving transducer performance, but in the present state of the art it is not possible to consistently manufacture a transducer with low and stable ringing while still maintaining other desirable features such as high sound output and rugged construction.

My commonly assigned U.S. Pat. No. 4,831,565, the content of which is incorporated herein by reference, discloses improvements providing the ability to relieve an operator from any involvement in setting the starting point or similar parameter, the ability to have the system continuously and automatically compensate for changes in transducer ringing, the ability to adjust automatically the operation of the system so that close-in echo detection is improved without compromising far echo detection, and the ability to detect defective or absent transducers or transducer connections. The techniques disclosed include the use of shots of short duration combined with special signal processing techniques for detecting close-in echoes which might otherwise be masked by transducer ringing. This provides substantial improvements in close-in performance. A need remains however for improved processing of more distant echoes.

U.S. Pat. No. 4,596,144 discloses several techniques for processing the data stored following a shot or shots so as to identify a desired echo in the presence of spurious echoes, these techniques being described with reference to FIGS. 3, 4 and 5 of the drawings of that patent, and developments of these techniques, particularly in relation to the initial portion of the echo profile, are disclosed in my pending applications already mentioned above. Various problems in echo identification however remain, as follows.

Many bins have false targets in the path of the sound wave. These targets can be in the form of pipes or wires but often consist of seams in the bin wall. In a narrow bin it is usually impossible to move the transducer far enough away to avoid these targets.

In bins containing solids, the material often rests at an angle with several steps in the material. Due to spreading the transducer beam echoes are received from more than one of these steps. Because each step is at a different distance from the transducer a cluster of echoes is received which may be overlapped in time or have narrow gaps between them. In the latter case the echo selection algorithms see these echoes as separate echoes (which they are) even though they should be considered as one echo.

Practical embodiments of my previous inventions have utilized echo processing techniques of the type described with reference to FIG. 4 of U.S. Pat. No. 4,596,144, to provide a time varying threshold or TVT by smoothing the echo profiles, the TVT being utilized as a reference for comparing echoes. I now find that this method of deriving a TVT may not provide optimum performance in compensating for circumstances in which sound attenuation within a bin varies with time, nor in matching the sound attenuation which takes place with increasing bin depth.

With targets which are close to the transducer, the echo produced by the target is partially masked by the transducer ringing. Assuming that the echo rises above the ringing by some amount then it is possible to detect its presence. A problem arises in comparing the strength of this echo with other later echoes in order to select the most likely true echo. In previous arrangements the TVT curve followed the smoothed echo profile so the size of a close-in echo could at best be equal to the amount by which it exceeded the ringing.

It has long been recognized in echo ranging technology that the width of the transmitted pulse can advantageously be adapted to the range being measured. A longer pulse, particularly when using a transmitter transducer with a high quality factor or Q, has increased energy and provides a stronger echo. On the other hand, it limits the minimum range that can be measured, because a short range echo may return before the transmission is completed, or whilst the transducer is still ringing at high amplitude. Various proposals have been made to overcome this problem. Thus U.S. Pat. No. 3,102,261 (Wippert) discloses the technique of varying the transmit pulse length according to the elapsed time to receipt of an echo following a preceding pulse. U.S. Pat. No. 4,000,650 (Snyder) discloses variation of both the pulse length and pulse repetition frequency upon a similar basis: thus the apparatus disclosed normally operates in a short shot mode in which a short pulse is used, but if an echo greater than a certain threshold is not received within a first limited range, a long shot mode is entered, and the largest echo received within a range beyond the first limited range is selected as the true echo. This technique does not overcome the problem that an echo cannot be detected whilst the transducer is still ringing at high amplitude following a pulse, which limits minimum range even with a short transmit pulse. In my U.S. Pat. No. 4,831,565 I disclose techniques for detecting echoes even in the presence of ringing of substantial amplitude, and use a short transmit pulse in combination with these techniques for detecting very short range echoes. A longer pulse is utilized except for detection of these very short range echoes. In the technique disclosed in the Snyder patents, and optionally in my own patent, a 'short shot' is taken at the beginning of each ranging sequence, and only if an echo is not detected with a short range is a 'long shot' taken. This opens the possibility that a short range spurious echo will prevent a long range measurement from ever being taken, since any short range echo which meets the requirements of the system, will be accepted as a true echo.

In fact, if a 'long shot' produces an apparently valid long range echo, then such an echo requires serious consideration as a true echo since such an echo could not normally be produced by a bin or container which is nearly full of material that is not itself a good propagator of acoustic energy. This is recognized in my U.S. Pat. No. 4,831,565, which suggests that in certain circumstances both long and short shots should be used, even when processing of the short shot does reveal an apparently valid echo, and if both shots produce an apparently valid echo, a determination should be made between them.

Some bins contain a fixed undesired target, such as a rough area on the bin wall. This false target can be difficult to distinguish from a true target. A known solution is to place a time window around the false target such that echoes within this window will not be considered in the echo selection process. When the location of the true echo enters this window the last correct reading is held until the location of the true echo leaves the window. There are two problems with this method; firstly, the level is not being measured when it is within the window and secondly, when the level is within the window there may be another strong false echo present outside the window, which will be selected as the true echo.

I have further found that no one echo identification technique which I have investigated uniformly provides the best results under all bin conditions.

SUMMARY OF THE INVENTION

I have now developed improved techniques for echo signal processing which address the above problems by providing improved techniques for selecting a true echo from amongst multiple echoes, for avoiding possible failure to select a distant echo in the presence of a short range spurious echo, and for improving the accuracy with which the range of an echo is determined.

The invention is thus directed to improvements in an acoustic ranging system as set forth in the appended claims, which set forth improvements, by which the effect of the problems discussed above can be reduced, the likelihood of selecting the correct echo can be improved.

SHORT DESCRIPTION OF THE DRAWINGS

DESCRIPTION OF THE PREFERRED EMBODIMENT

Figure 1:
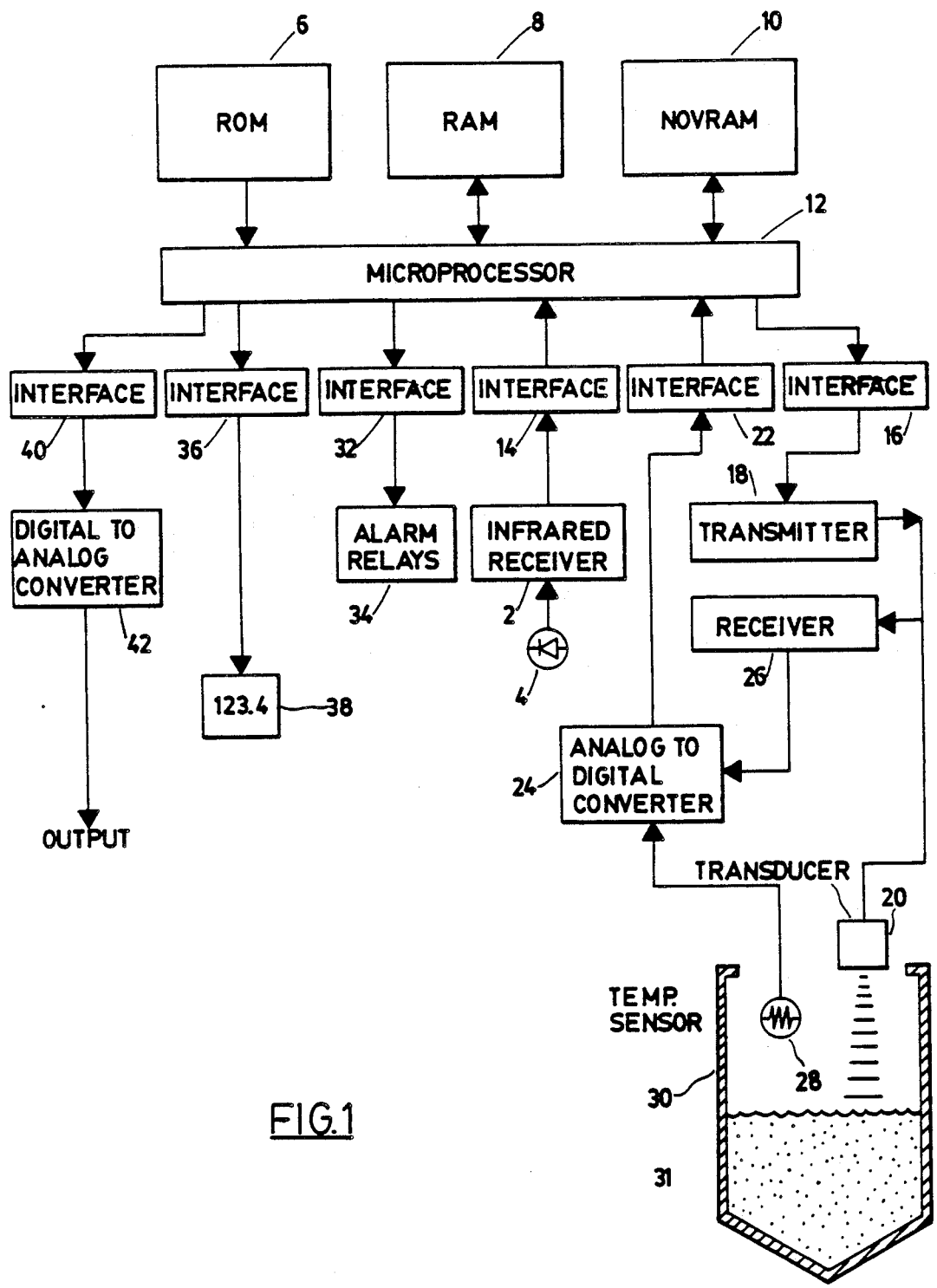
FIG. 1 is a block schematic diagram of a presently preferred embodiment of a system in accordance with the invention.

Referring to FIG. 1, the diagram shown of a computer unit is a simplified version of that shown in FIG. 1 of U.S. Pat. No. 4,596,144, with the difference that the keyboard 52 and control keys 58 of that patent are replaced by an infrared receiver 2 associated with an infrared sensor diode 4, and the division of the memory in three rather than two parts, read only memory 6, random access memory 8 and non-volatile memory 10. The non-volatile memory may be implemented by a conventional RAM with battery backup, or implemented by RAM chips with integral battery backup, or by electrically alterable and erasable read only memory or magnetic bubble memory or any other suitable technology combining the ability to retain memory content under power down conditions with the ability to alter memory content under program control. The non-volatile memory, referred to for convenience as NOV-RAM, is utilized for retaining constants which are dependent on a particular installation or configuration or which only require alteration at long intervals, such as configuration and calibration data.

The read only memory 6 contains a predetermined program which controls a microprocessor 12, which in turn utilizes the random access memory 8 for working memory and temporary storage of variable data, whilst constants other than those predetermined by the program itself are stored in the NOVRAM 10. The main portion of the program itself may be essentially as described in U.S. Pat. No. 4,596,144 except for amendment to segregate the data addresses utilized appropriately between the memories 8 and 10, and any revision of the routines associated with an interface 14 to the receiver 2 so as to suit it to receive data from such a source rather than a keyboard or control keys. The portion of the program related to echo recognition is however further developed as set forth below with reference to FIGS. 2 onwards, with a view to improving echo detection performance.

Further interfaces are provided to various other microprocessor peripherals. An interface 16 is provided to a transmitter 18 sending pulses to an external ultrasonic transducer 20, an interface 22 with an analog to digital converter 24 receiving return signals from the transducer 20 via a receiver 26, and from an external temperature sensor 28. The transducer 20 and sensor 28 are appropriately mounted in relation to a bin or silo 30 which is being monitored. An interface 32 is provided to an alarm relay unit 34, which may drive alarm indicator lamps and possibly external alarm devices, whilst an interface 36 drives a digital display 38. A further interface 40 drives a digital to analog converter and current source serial data transmitter 42. Whilst the various interfaces have been shown as separate functional blocks, it will be understood that they may be implemented by a lesser number of physical interface circuits providing multiple ports, or may be integrated either into the peripheral circuit which they interface or into a microcomputer which may incorporate the microprocessor 12 and all or part of the memories 6 and 8.

The diode 4 associated with the receiver 2 can receive modulated data from an infrared source diode driven by a coding circuit, which causes the diode to emit different pulse trains according to which key of a number of keys on a separate keypad has been depressed. The diode, encoder, a battery powering the circuit, and the keypad, are incorporated into a small portable calibrator unit which may be constructed similarly and utilizing similar devices, to the infrared remote control units widely used to control domestic appliances such as television sets. The receiver 2 and diode 4 may also be similar to those utilized in remote control receivers and providing digital outputs responsive to key presses applied to a keypad on a transmitter.

In operation, and under program control, the interface 16 outputs a trigger pulse to the transmitter and receiver 18 and 26, resulting in the transmission of a shot and the subsequent reception, logarithmic amplification and digitization of the return echo signal, as described in more detail in U.S. Pat. No. 4,596,144. Bytes representing the digitized sample are input from ADC 24 through a parallel input port provided by interface unit 22 and are stored in memory 8. If the program calls for additional shots at the same transducer 20, the data recovered from these is stored and averaged or otherwise correlated with the data stored from previous shots. Typically provision is made for separate storage in memory of data from at least three shots. The data stored in memory thus represents the echo profile of a shot or shots and/or the average profile of a series of shots, represented in terms of amplitude in decibels after successive intervals varying from 12 ms for 2 mm resolution to 240 ms for 40 mm resolution, as required. The routines utilized are further described in my U.S. Pat. No. 4,831,565, the content of which is herein incorporated by reference. The present system thus generates a digital data base or echo profile which can be subjected to further processing with a view to maximizing likelihood of correctly identifying a wanted echo.

The data so stored is processed under program control using signal processing algorithms embodied in a routine stored in ROM 6 designed to detect a wanted echo. Certain parameters, utilized by the routine may be changed from default selections stored in ROM 6 by data entered via receiver 2.

Figures 2, 3:
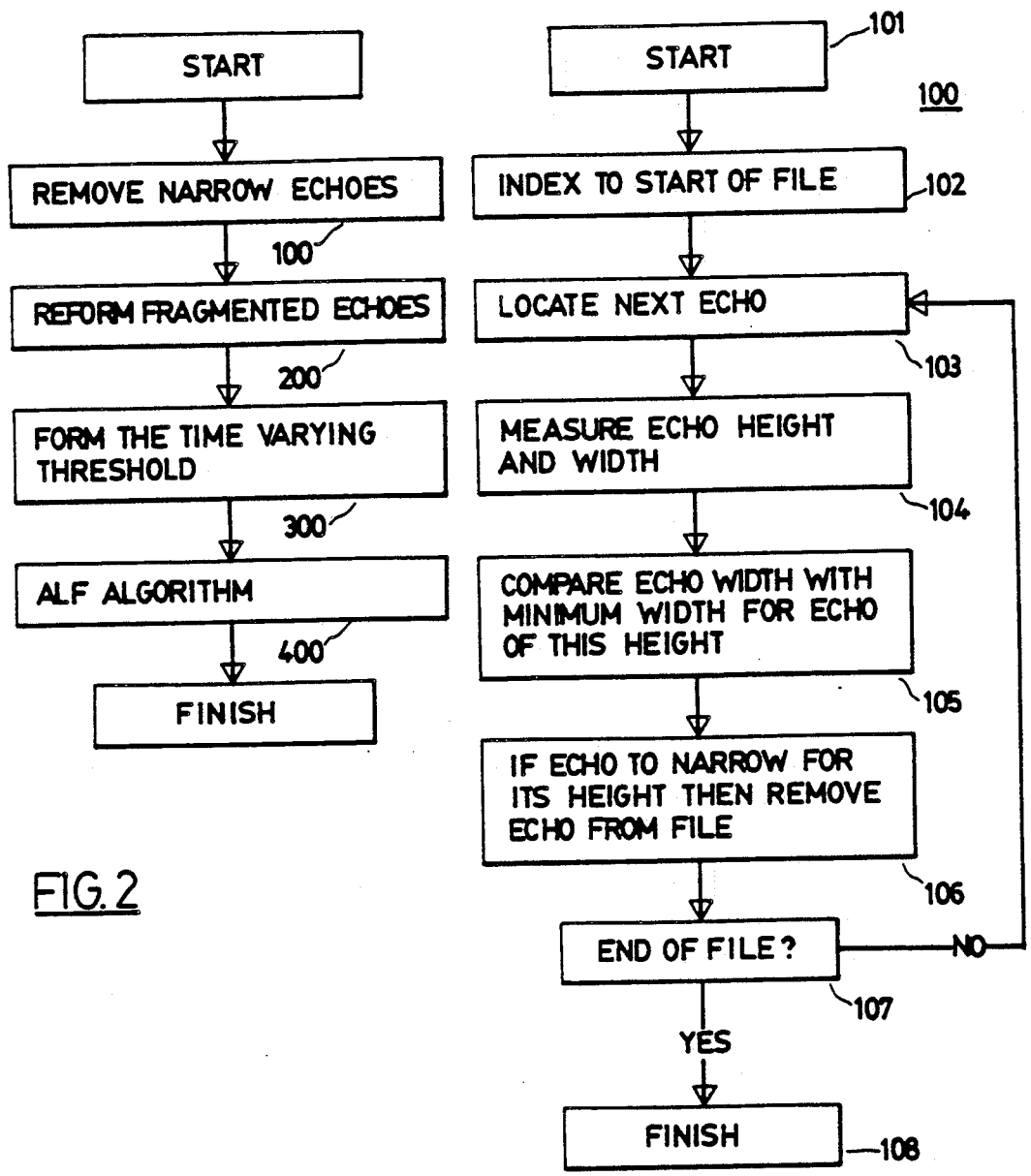
FIGS. 2-6 are flow diagrams illustrating the processing of an echo profile stored in memory so as to identify a desired echo.

The echo profile processing routine of the present invention is outlined in FIG. 2, and comprises four main stages. It is utilized in the processing of echo profiles generated by "long" shots, i.e. shots employing relatively longer transmitted pulses to detect echoes beyond a certain limited distance from the transducer, as opposed to "short" shots utilized for the detection of close-in echoes.

Figure 7:
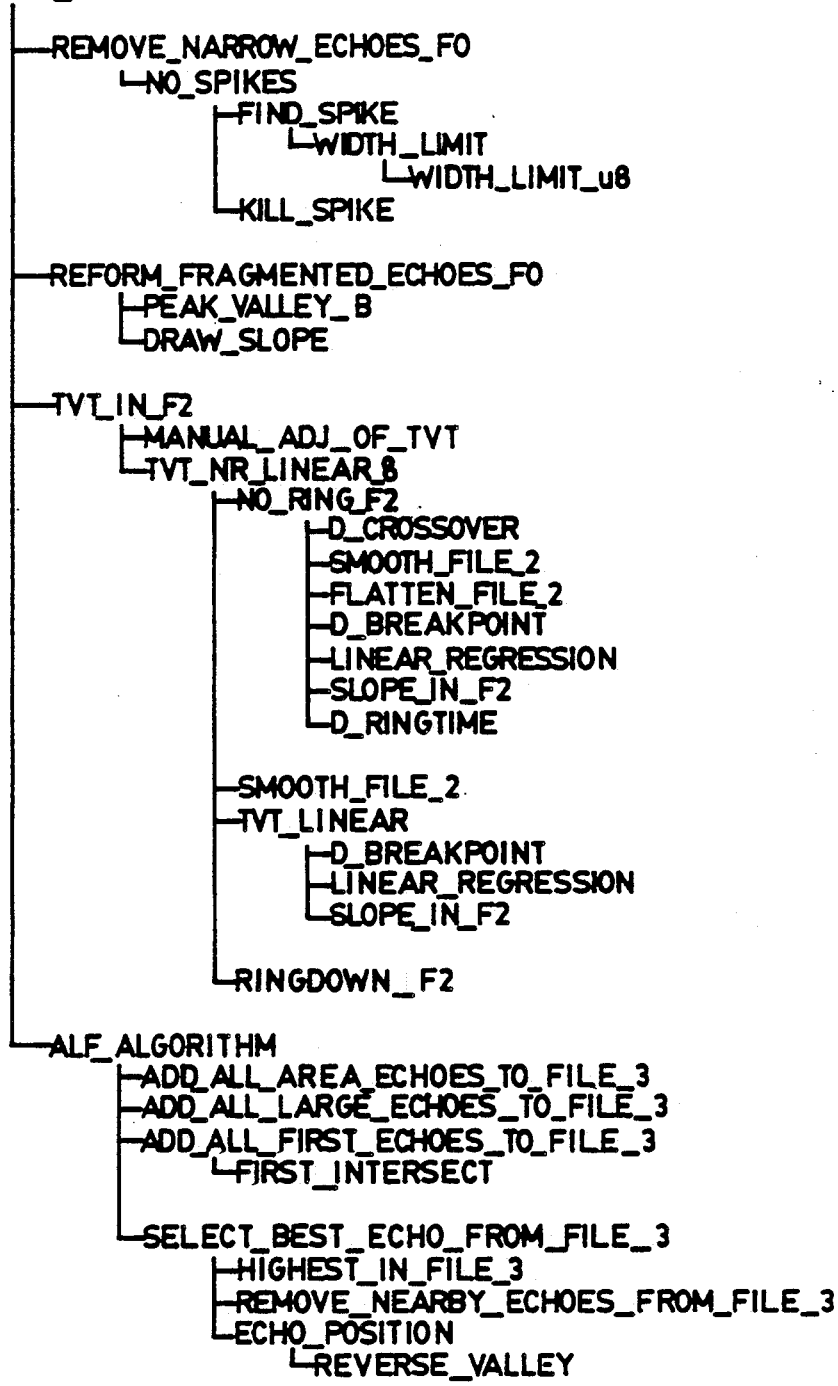
FIG. 7 is a tree diagram illustrating the structure of the processing routine.

The processing stages for long shots are described further with reference to FIGS. 2 and 7. Source code of the various subroutines mentioned in this and subsequently described stages of processing is found in the specification of my U.S. Pat. No. 4,890,266, which source code is hereinto incorporated by reference; this source code is written in assembly language for the Motorola (trade mark) 6809 microprocessor. The processing stages are called successively within a portion of a main routine labelled PROCESS_LONG (see FIG. 7), operating on a file F0 which contains a stored digitized echo profile to be processed. After the first two stages 100 and 200 of processing, a file F1 is loaded from F0 and processed in stage 300 to provide a file F2 which contains a digitized time varying threshold or TVT. In the final stage 400, the files F1 and F2 are compared in various ways to select a true echo.

Short shots are prefereably processed as described in my U.S. Pat. No. 4,831,565. That patent describes a sequence in which long shots are performed only if a short shot fails to detect an echo meeting detection criteria. It is preferred however to utilize both long and short shots in each ranging operation as discussed further below, to avoid the possibility of a short range spurious echo improperly suppressing the transmission of long shots and thus locking out all but the very short ranges intended to be handled by the short shots.

Figure 8:
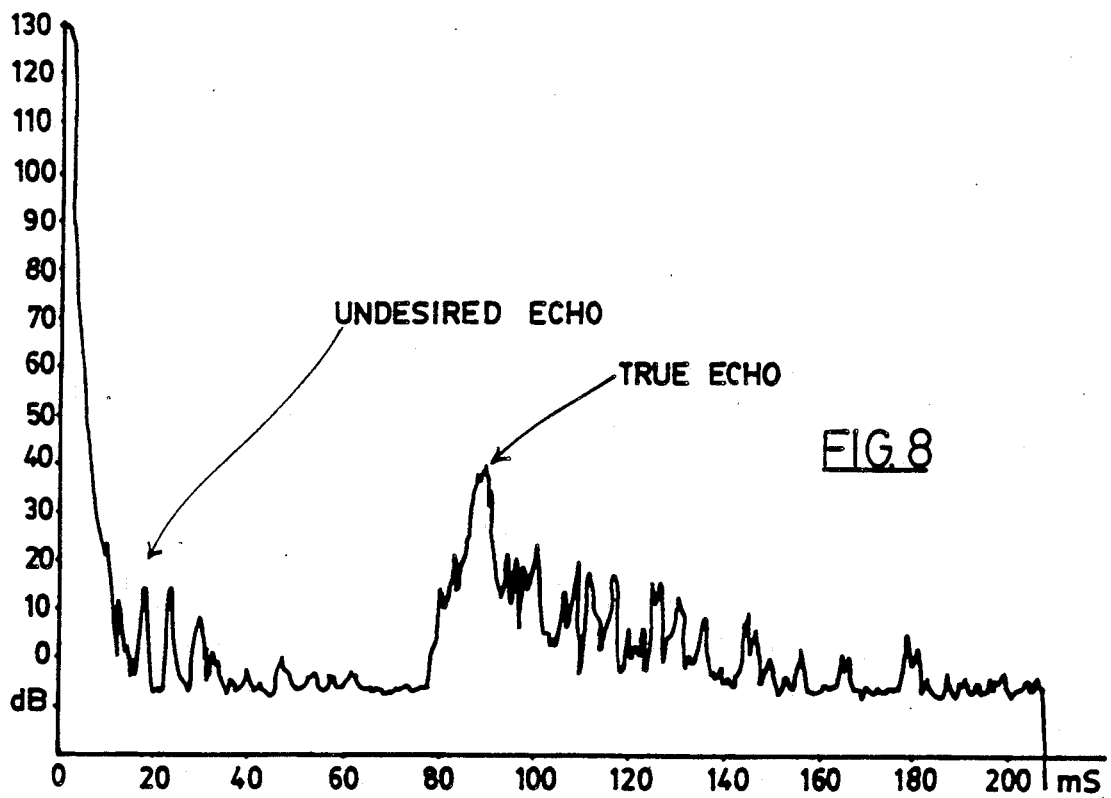
FIGS. 8-11 are graphs illustrating certain functions carried out by the routine.
Figure 9:
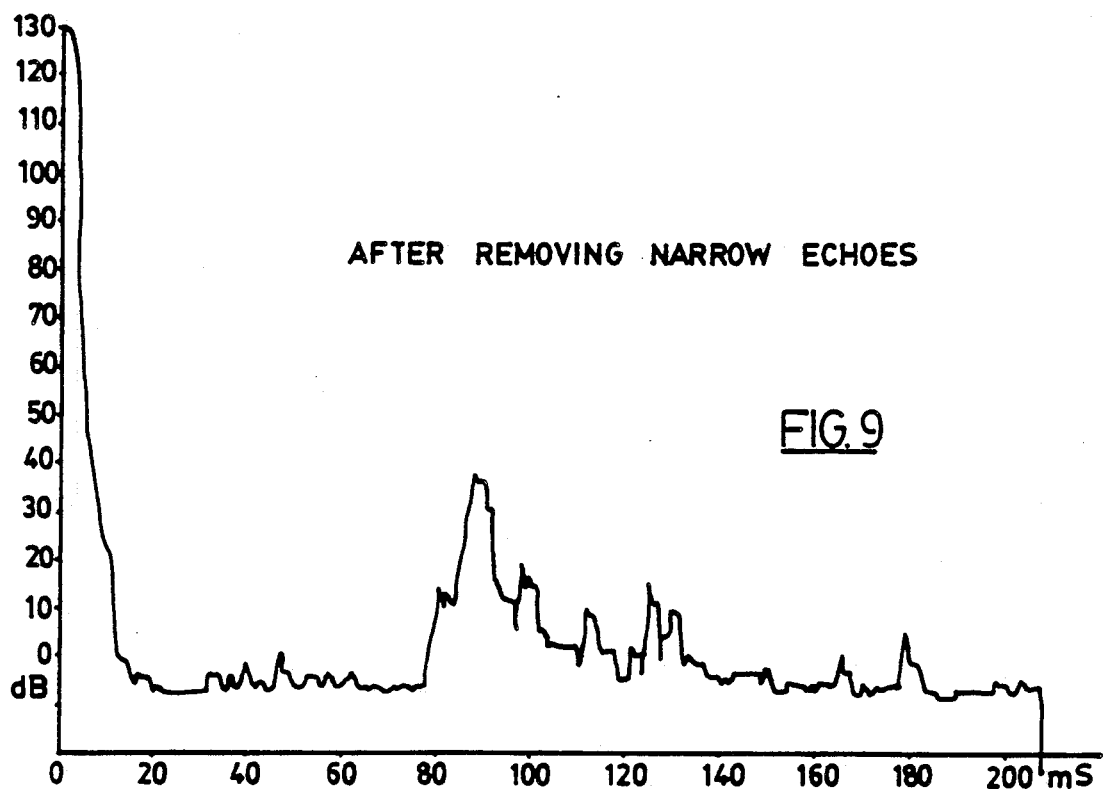

The stage 100 is described in more detail with reference to FIG. 3. The start and finish 101 and 108 of the stage are encompassed within a subroutine labelled REMOVE_NARROW_ECHOES_F0 which in turn calls a subroutine labelled NO_SPIKES. This subroutine indexes to the beginning of the file F0 at (step 102), and calls a subroutine FIND_SPIKE which searches through the file F0 looking for peaks in the echo profile (step 103), and calling nested subroutines WIDTH_LIMIT and WIDTH_LIMIT_US to measure the peaks (step 104) and test the width of such peaks against values looked up in a table (step 105). When a peak is located satisfying preselected narrowness criteria, as determined by preset parameters, a subroutine KILL_SPIKE is called (step 106), which modifies the profile by maintaining the sample amplitude constant for samples from the detected beginning of the spike to either the detected end of the spike or an intersection with the original profile, whichever occurs first. Until the end of the file is detected at (step 107), the FIND_SPIKE and KILL_SPIKE routines are then called repeatedly so as to eliminate narrow peaks from the echo profile file, and convert it from a form as shown in FIG. 8 to a form as shown in FIG. 9. Although the embodiment described selects peaks to be removed based on preset parameters, these parameters could if desired be calculated from an examination of the echo profile.

Figure 10:
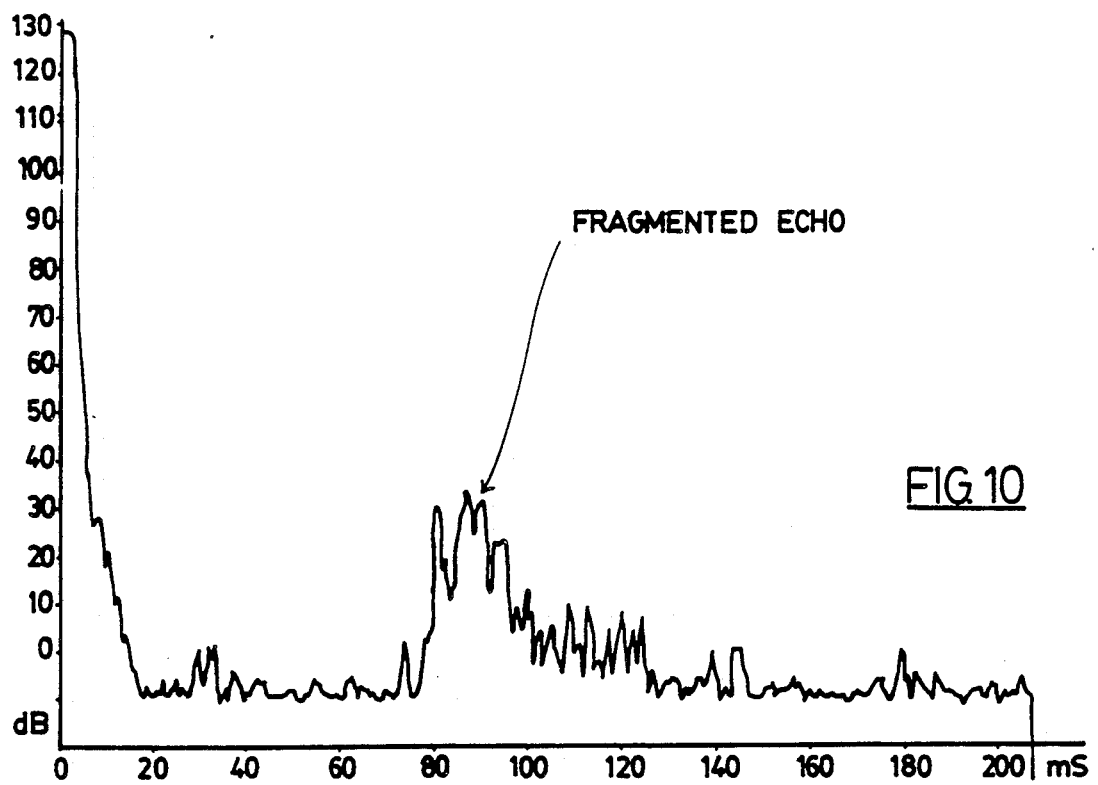
Figure 11:
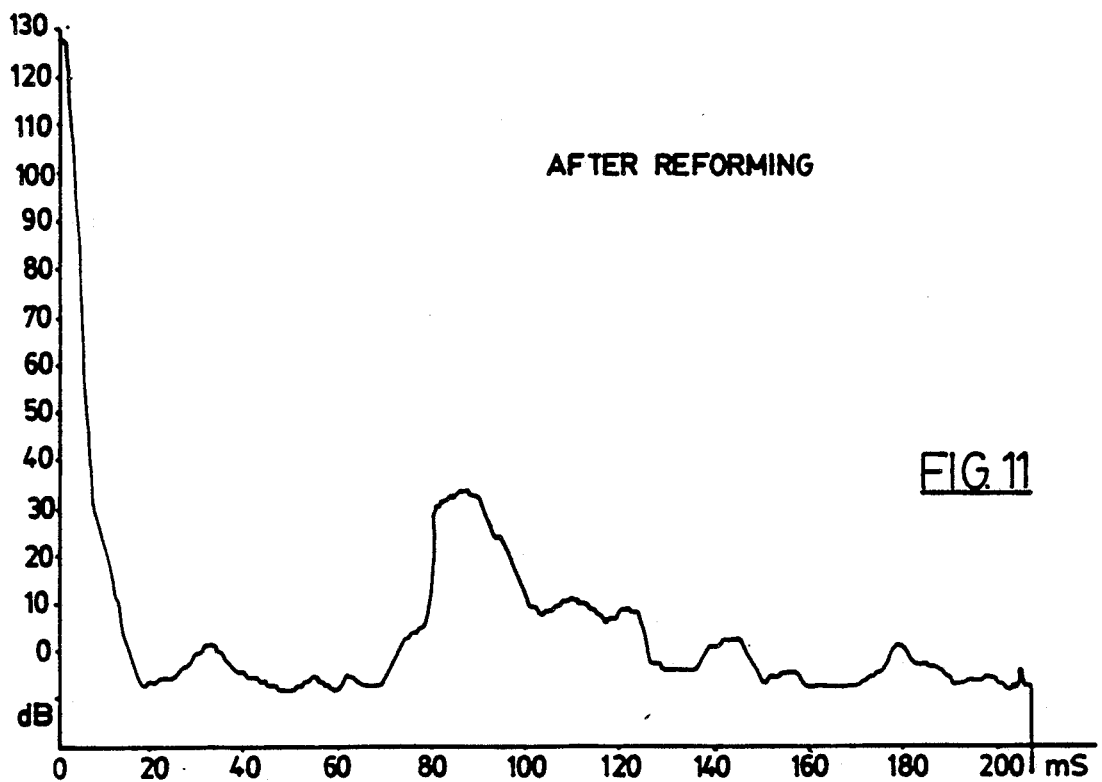

The next stage 200 reforms echoes which may be fragmented due to steps in the surface of material in a bin, as already discussed above. I have found that this can be achieved by removing narrow dips in the stored echo profile, the maximum width of a dip to be removed being determined by setting of a parameter. This procedure tends to convert a cluster of fragmented echoes into a single, wide echo which is more readily recognizable as a true echo, as will be seen from a comparison of FIGS. 10 and 11, which shown an echo profile respectively before and after reforming.

Figure 4:
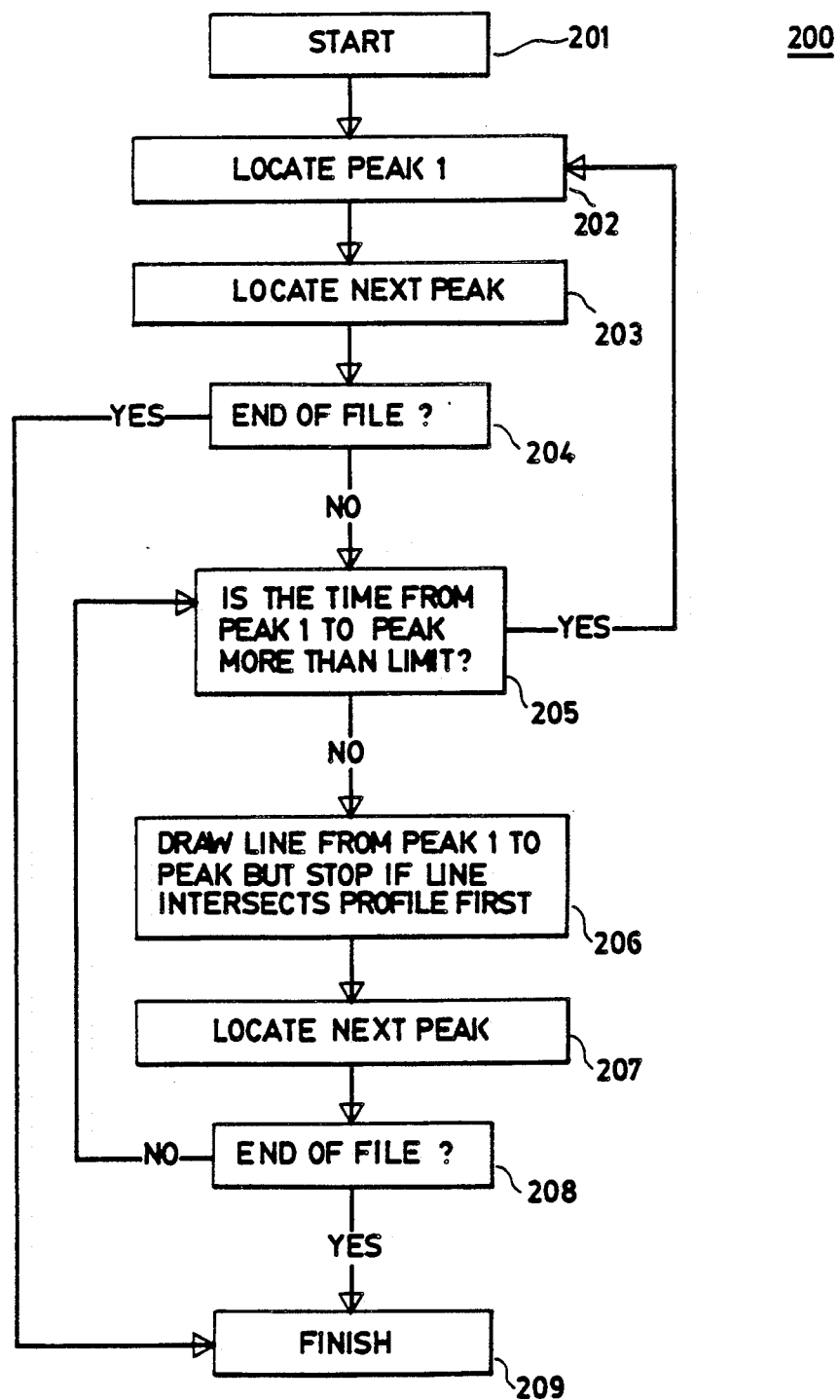

Referring to FIGS. 4 and 7, the stage 200 is performed by the subroutine REFORM_FRAGMENTED_ECHOES_F0. This subroutine starts at 201 (see FIG. 4), and removes dips in the profile by locating peaks in the profile, and drawing lines of predetermined slope from each peak to the start of each following peak which is no further than a predetermined distance from the first peak. Starting at the beginning of the file, peaks followed by valleys of more than a predetermined depth are located by the subroutine PEAK_ALLEY_B (see step 202 in FIG. 4) and the distance to a following peak is determined (step 203) (unless the end of the file is reached first (see step 204) in which case the subroutine ends (step 209). If the distance between the peaks is determined to be more than a precalculated distance (step 205), the routine loops to step 202, otherwise a subroutine DRAW_SLOPE is called (step 206) to perform the line drawing function. At the end of the drawn line, a search for a following peak is recommenced (step 207), and the subroutine checks for the end of file (step 208) and loops to step 205 unless the end of the file has been reached in which case the subroutine ends at step 209.

Figure 5:
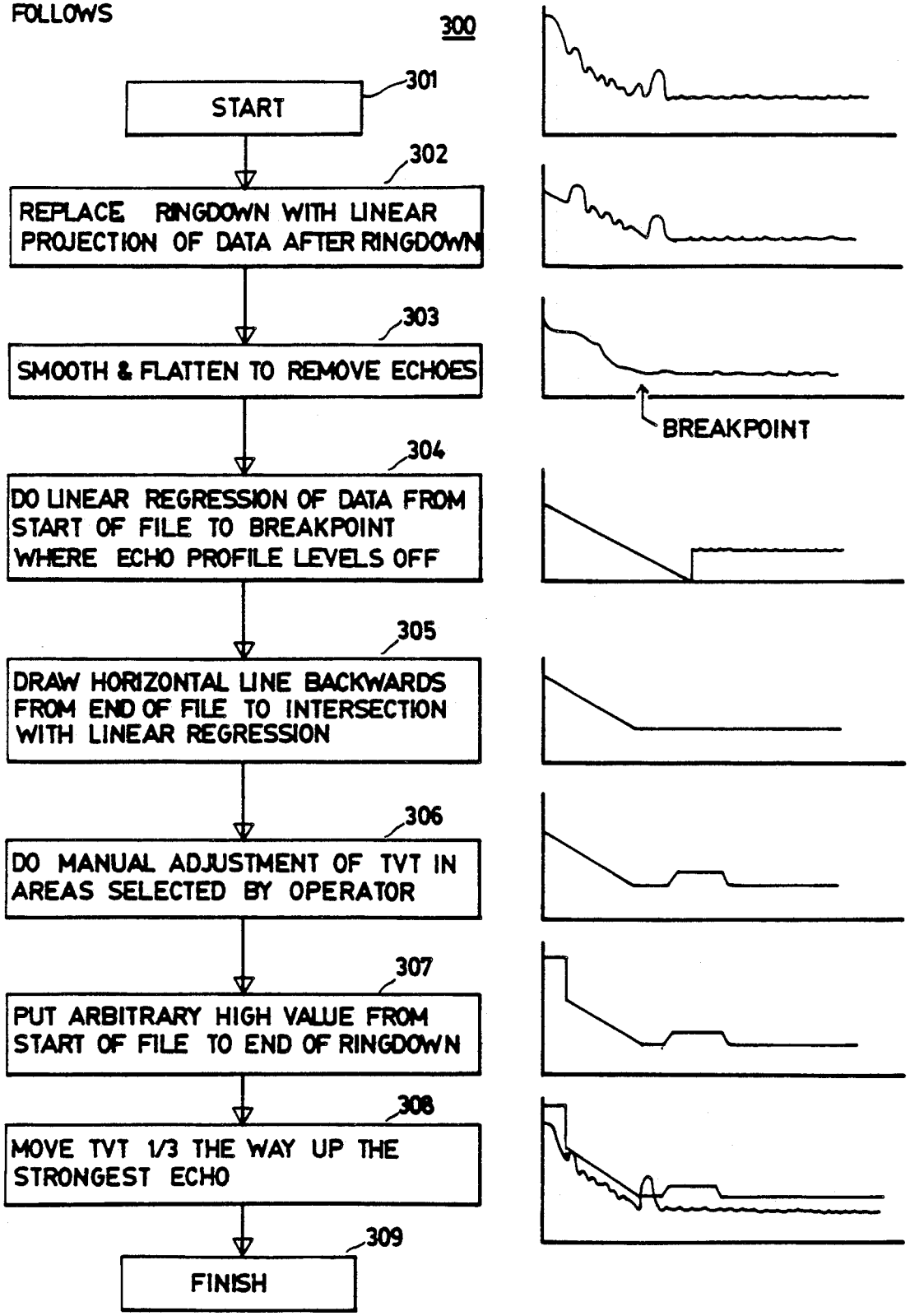
Figure 6:
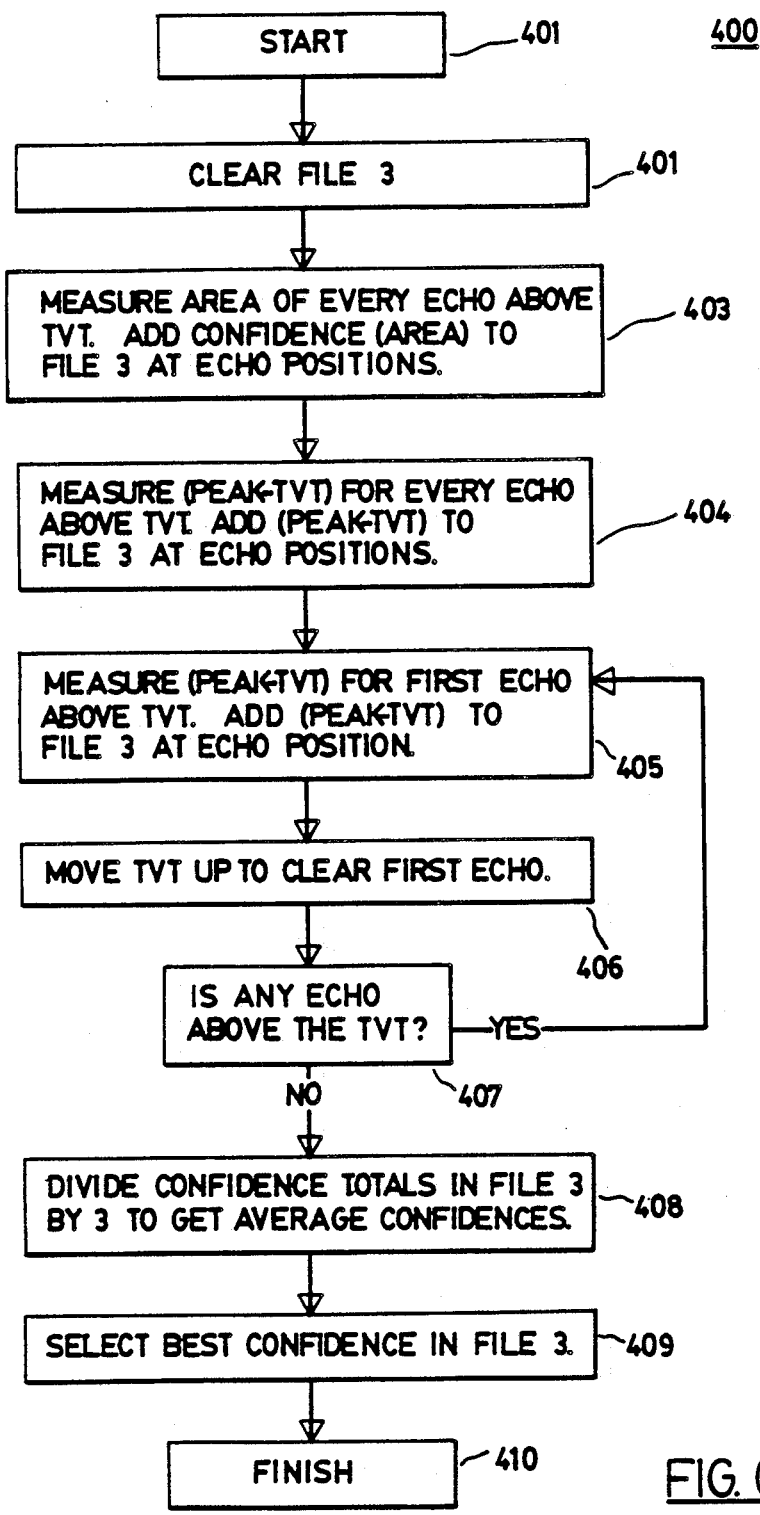

The stage 300 is set forth in FIG. 5, in which the diagrams on the right hand side illustrate the successive stages in formation of a time varying threshold (TVT) from a copy of the echo profile taken from file 1. In practice, the routine illustrated in FIG. 5 represents a subroutine TVT_NR_LINEAR_S which is just one of several different routines for deriving the TVT from the echo profile, the subroutine being selected from a table of alternative subroutines in an initial stage 301 of the 5/4/88 subroutine TVT_IN_F2 (see FIG. 7) according to a preset control parameter. Other routines in the table may be those disclosed in U.S. Pat. No. 4,596,144, such as a TVT produced by smoothing of the echo response which may give optimum results in certain applications, or modifications of the routine to be described. A final stage 308 of the stage 300, also included in subroutine TVT_IN_F2 adjusts the position of the TVT relative to the echo profile so as to move it $\frac{1}{3}$ (typically) way up the strongest echo. A further subroutine MANUAL_ADJ_OF_TVT called from TVT_IN_F2 enables an operator to make local manual adjustment (step 306) to the TVT to compensate for known spurious echoes in a bin being monitored. By referring to test echo profiles, the location and magnitude of such echoes can be determined, and the TVT profile adjusted upwardly to ensure that such echoes are not selected as true echoes, whilst still permitting a true echo superimposed on a spurious echo to be detected. The subroutine MANUAL_ADJ_OF_TVT permits any segment of the TVT profile to be selected and the sample values in that segment to be altered by a selected increment.

The subroutine TVT_NR_LINEAR_S calls various further subroutines NO_RING_F2, SMOOTH_FILE_2, TVT_LINEAR and RINGDOWN_F2. The subroutine NO_RING_F2 performs the functions of step 302 in FIG. 5. The first part of the echo profile is initially replaced by a line from its start to the end of a "short shot" zone selected by a subroutine D_CROSSOVER. This zone is that within which ranging would normally be carried out using a shortened transmit pulse and the technique described in my U.S. Pat. No. 4,831,565 for detecting closein echoes in bins that are nearly full. The present routine, which is intended for detecting longer range echoes, makes no attempt to locate echoes within the "short shot" zone. The line which replaces this initial portion of the profile is a horizontal line at a level corresponding to the lowest point on the portion replaced. The remaining data is then subjected to smoothing and flattening routines SMOOTH_FILE_2 and FLATTEN_FILE_2 to remove echoes from the profile. The smoothing routine averages adjacent points, the number of points being averages being selectable to adjust the degree of smoothing. The flattening routine flattens all rising portions of the profile to remove echoes.

A subroutine D_BREAKPOINT then locates the breakpoint on the profile at which the overall downward gradient of the profile cease, and a subroutine LINEAR_REGRESSION performs a linear regression of data from the portion of the file preceding the breakpoint. A subroutine SLOPE_IN_F2 then draws in file F2 a profile corresponding to the slope of the linear regression. The profile in file F2 is compared with the initial echo profile in file F1 and the portion of file F1 preceding its first intersection with the linear regression profile in file F2 is replaced by the corresponding portion of the file F2, i.e. the ringdown portion of the echo profile is replaced by a linear regression.

This modified file F2 is then again processed using the subroutines SMOOTH_FILE_2 (step 303) and a subroutine TVT_LINEAR which latter subroutine calls the subroutines D_BREAKPOINT, LINEAR_REGRESSION and SLOPE_IN_F2, which again plot a linear regression based on the portion of the profile prior to the breakpoint (step 304). The subroutine TVT_LINEAR then draws a horizontal line backwards from the end of the file to an intersection with the linear regression (step 305), to produce a time varying threshold TVT in file F2.

Finally, the initial ringdown portion of the threshold profile is adjusted to a level higher than the level of any predicted echo profile during this portion by the subroutine RINGDOWN_F2.

In stage 400, the time varying threshold developed in file F2 by the subroutine TVT_IN_F2, whether using the technique just described or alternative or modified techniques, is compared with the echo profile processed in stages 100 and 200 and stored in file F1, and a selection made of a probable true echo based on various criteria or a combination of them, under control of the subroutine ALF_ALGORITHM. This subroutine starts at step 401 and commences by clearing a file F3 (step 402) to receive echo data developed during subsequent steps 403, 404, 405, although a parameter can be preset to determine which of these steps are in fact carried out. Normally all three will be used, although one or two may be omitted if they produce consistently less reliable data in a particular application.

In step 403, implemented by a subroutine ADD_ALL_AREA_ECHOES_TO_FILE_3, a figure proportional to the area of every echo in the profile protruding above the TVT is added to file F3 in a location corresponding to the position of the peak concerned. The subroutine compares both files, starting at the beginning, looking for an initial rising intersection of the echo profile with the TVT. It then sums and stores the area between the curves until a falling intersection is reached, and also detects and stores the location of the last sample having a peak value between the intersections. A value equal to a fraction typically ⅛ of the area is stored in a location in the file F3 corresponding to the location of the last sample having the peak value. This procedure is then repeated for each pair of rising and falling intersections until the end of the files F1 and F2 is reached.

In step 404, implemented by a subroutine ADD_ALL_LARGE_ECHOES_TO_FILE_3, a similar procedure is utilized, except that instead of summing the area beneath the echo profile between each pair of intersections, the height of each peak above the TVT is determined and stored.

In step 405, implemented by a subroutine ADD_ALL_FIRST_ECHOES_TO_FILE_3, a similar procedure to step 404 is again utilized, except when a peak has been detected and its value stored by the subroutine FIRST_INTERSECT, the TVT is raised to intersect that peak before searching for a following peak (step 406), until no further peak is detected (step 407). The height of each peak detected above the adjusted TVT level is determined and stored.

After these steps 403–405 (or any selected subset of them), the values stored in file F3, whose positions represent the echoes detected and whose magnitudes represent the sum of echoes detected at a particular position are divided by the number of steps performed (step 408) and subjected to a routine SELECT_BEST_ECHO_FROM_FILE_3 to determine the position of the true echo (step 409) before returning (step 410). As a first stage of determining the echo position, a subroutine HIGHEST_IN_FILE_3 locates the highest value in file F3, and then a routine REMOVE_NEARBY_ECHOES_FROM_FILE_3 clears portions typically ⅛ of the length of the file, on either side of this highest value, whereafter the highest remaining echo in the file is detected. The difference between the highest value and next highest non-adjacent value represents the confidence factor applicable to the echo detection routine.

A subroutine ECHO_POSITION is then used to redetermine the position of the echo identified by the highest value in file F3, by comparing the echo profile in file F1 and the TVT curve from file F2 so as to identify that intersection most nearly preceding the position of the highest value in F3, locating the valley in the profile preceding the intersection, deriving a sill value which is the average of the valley value and the peak value, and determining the temporal location of the intersection of the sill and the echo profile following the valley. This helps meet a resolution problem with such apparatus. The prima facie resolution of the apparatus is determined by the sampling rate of the analog-to-digital converter 24. In practice, however, a valid echo will be a number of cycles wide, and usually substantially wider than the original pulse, particularly at longer ranges, because of the different path lengths over the width of the beam, because of intermediate reflections off the walls of a container, because of sloped, coned or stepped surfaces of the material being measured, and so on. The position within the echo which most accurately represents the actual range it is desired to measure may therefore be difficult to determine, and will not necessarily correspond to the peak of the echo. I have found that good results can be obtained by adopting the above routine, which locates a point half way up the leading slope of the echo between the preceding valley and its peak as a nominal position of the echo for range determination purposes.

Figure 12:
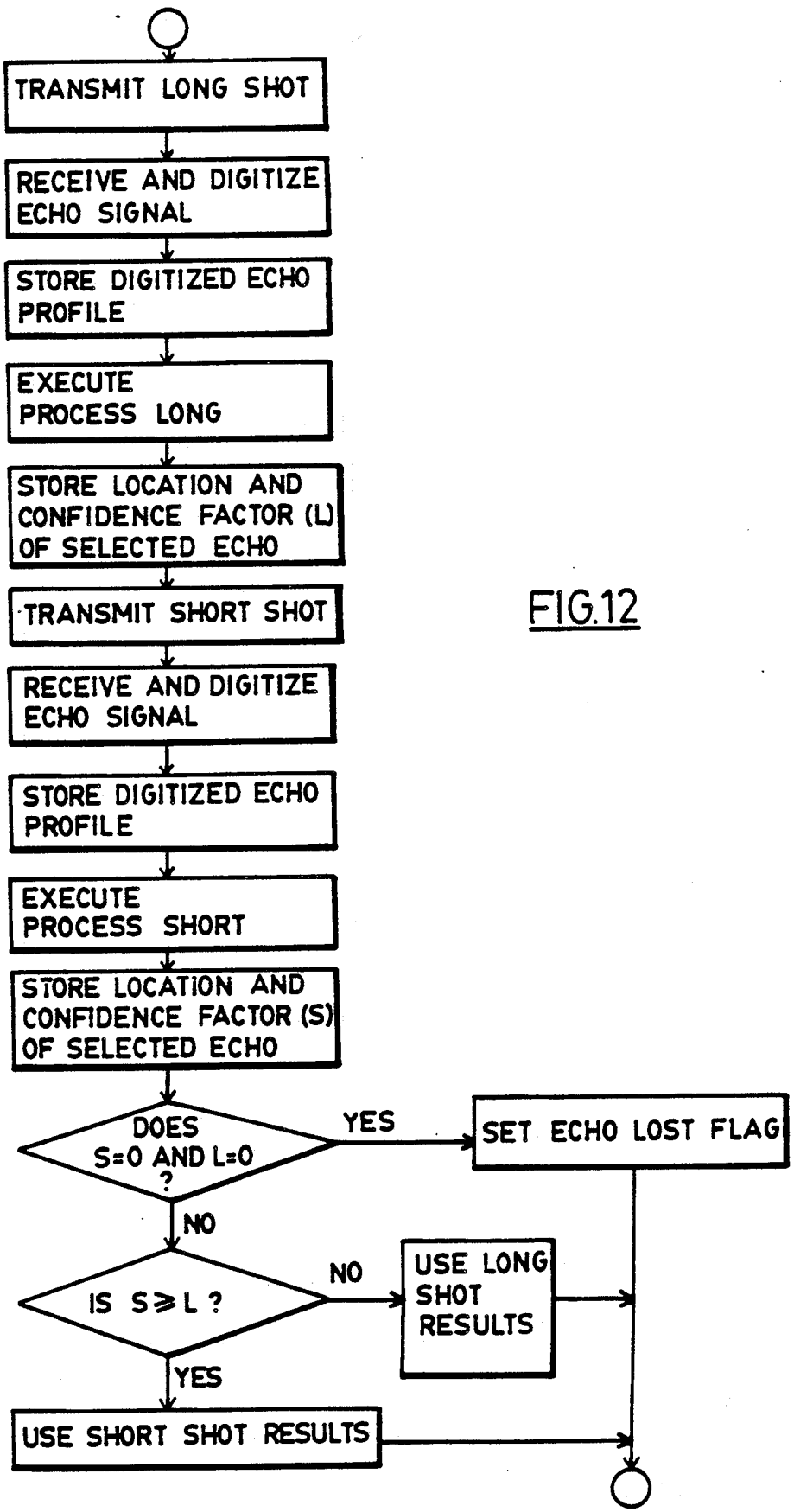
FIG. 12 is a flow diagram illustrating a typical ranging operation utilizing both long and short shots.

Referring now to FIG. 12, the correlation of the LONG process just described to the processing of the associated short shot will now be described. The figure shows a flow diagram of a typical ranging operation, commencing with the energisation of the transmitter 18 to produce a long shot from the transducer (step 120), the reception of return echo signals by receiver 26 and the digitization by analog-to-digital converter 24 (step 121), and their storage in RAM 8 by microprocessor 12 (step 122). The shot is then processed as set forth above and outlined in FIG. 7 (step 123), and the echo position and echo confidence factor L are stored (step 124). A short shot is then transmitted (step 125), and the return echo signal is again received and digitized (step 126), and that portion of the echo profile corresponding to a range of typically less than 1 meter is stored (step 127). The shot is then processed as described in my U.S. Pat. No. 4,831,565 (step 128), and the echo position and echo confidence factor are stored. In this case, any significant upturn in the echo profile is considered to be a wanted echo, since at such short ranges, the ringing amplitude of the transducer will be high but falling rapidly, and only a strong echo will be able to reverse this trend. The confidence factor S is the size of the upturn.

The confidence factors L and S are then examined, if necessary after weighting to compensate for their different modes of calculation, and to provide any desired bias, usually in favour of the short shot, for reasons discussed below. If both factors are zero (step 129), then neither shot has produced a valid echo, and a lost echo flag is set (step 130). If the confidence factor S is equal or greater than L (step 131), then the short shot result is taken (step 132), otherwise the long shot result is taken (step 133). Normally one or the other confidence factor will be zero in that only one of the processes should succeed in detecting an echo.

It will be understood that other criteria could be used for deciding which result to accept if both long and short shots result in detection of a valid echo, for example based on the results of either previous and/or confirmation shots, and different criteria could be used for assessing confidence level.

By the above means, and in particular the comparison of confidence factors, the long and short shot processing is integrated so that echoes across the entire range of operation of the apparatus are considered in selecting a true echo and in assessing its confidence factor. It will be noted that in the preferred embodiment described above, an apparently valid short range echo is selected in preference to an apparently valid long range echo if the confidence factors of the two echoes are equal. A very short range reading however normally involves a close to full or close to overflow condition of a container being monitored, and it is considered that such a reading should be displayed, if no very evidently more valid echo can be detected. For this reason it may even be desired to weight the confidence factor of the short range echo to favour its selection if both long and short shots produce apparently valid echoes.

I claim:

1. In an acoustic ranging system comprising at least one electro-acoustic transducer directed towards the surface of material whose level is to be determined, a transmitter to transmit pulses of electrical energy to energize selectively each said transducer whereby to cause it to emit at least one shot of acoustic energy at a predetermined frequency, a receiver receiving and amplifying electrical energy from said at least one shot regenerated by said transducer from acoustic energy at the same frequency received by the transducer over a subsequent period, the time lapse after a shot before receipt by said receiver of energy regenerated from an echo from said surface being proportional to the distance of the origin of the echo, signal processing means comprising analog to digital converter means to sample repeatedly the output amplitude of the signal from the receiver at defined intervals and to digitize the samples; memory means to store an extended sequence of digitized samples so produced in respect of at least one shot and form therefrom a digital data base file depicting an amplitude/time profile of the received signal with a resolution dependent on the sampling intervals; and computing means programmed to utilize the amplitude profile depicted by the data in said data base to help isolate relative to a time axis a portion of the output signal produced by said at least one shot deemed most probable to correspond to a wanted echo, and to determine a range represented by an echo within said portion of the time axis;

the improvement wherein the computing means is programmed to generate a time varying threshold file derived from said digital database file, to compare said files to produce a comparison file of data relating to peaks in the echo profile, and to manipulate the data in at least one of said database file and said threshold file prior to or during comparison to reduce the likelihood that spurious features of the profile of the received signal representing the database file will affect recognition of a true echo from the data in said comparison file.

2. In an acoustic range finding system comprising at least one electro-acoustic transducer directed towards the surface of material whose level is to be determined, a transmitter to transmit pulses of electrical energy to energize selectively each said transducer whereby to cause it to emit at least one shot of acoustic energy at a predetermined frequency, a receiver receiving and amplifying electrical energy from said at least one shot regenerated by said transducer from acoustic energy at the same frequency received by the transducer over a subsequent period, the time lapse after a shot before receipt by said receiver of energy regenerated from an echo from said surface being proportional to the distance of the origin of the echo, signal processing means comprising analog to digital converter means to sample repeatedly the output amplitude of the signal from the receiver at defined intervals and to digitize the samples; memory means to store an extended sequence of digitized samples so produced in respect of at least one shot and form therefrom a digital data base file depicting an amplitude/time profile of the received signal with a resolution dependent on the sampling intervals; and computing means programmed to utilize the amplitude profile depicted by the data in said data base to help isolate relative to a time axis a portion of the output signal produced by said at least one shot deemed most probable to correspond to a wanted echo, and to determine a range represented by an echo within said portion of the time axis;

the improvement wherein the stored amplitude profile is compared to a reference curve to isolate any features of the profile extending above the reference curve for consideration as a potential true echo; and means is provided to adjust the relative amplitudes of the profile and the reference curve to assist in discriminating a valid echo.

3. A system according to claim 2, wherein the means provided to adjust the relative amplitudes of the profile and the reference curve acts throughout the length of the profile being examined.

4. A system according to claim 2, wherein the means provided to adjust the relative amplitudes of the profile and the reference curve acts selectively so as to permit discrimination against spurious echoes of known location and intensity.

5. In an acoustic range finding system comprising at least one electro-acoustic transducer directed towards the surface of material whose level is to be determined, a transmitter to transmit pulses of electrical energy to energize selectively each said transducer whereby to cause it to emit at least one shot of acoustic energy at a predetermined frequency, a receiver receiving and amplifying electrical energy from said at least one shot regenerated by said transducer from acoustic energy at the same frequency received by the transducer over a subsequent period, the time lapse after a shot before receipt by said receiver of energy regenerated from an echo from said surface being proportional to the distance of the origin of the echo, signal processing means comprising analog to digital converter means to sample repeatedly the output amplitude of the signal from the receiver at defined intervals and to digitize the samples; memory means to store an extended sequence of digitized samples so produced in respect of at least one shot and form therefrom a digital data base file depicting an amplitude/time profile of the received signal with a resolution dependent on the sampling intervals; and computing means programmed to utilize the amplitude profile depicted by the data in said data base to help isolate relative to a time axis a portion of the output signal produced by said at least one shot deemed most probable to correspond to a wanted echo, and to determine a range represented by an echo within said portion of the time axis;

the improvement wherein the computing means is programmed to derive, following identification of a portion of the output signal deemed most probable to correspond to a wanted echo, a value intermediate in level between a peak of the signal profile at said portion and a valley immediately preceding said peak, and to identify a point on said signal profile between said valley and said peak at which said level is reached as a nominal position of the echo.

6. A system according to claim 5, wherein the receiver has a logarithmic amplification characteristic, and the intermediate value is the average of the level at the peak and the level of the valley.

7. In an acoustic range finding system comprising at least one electro-acoustic transducer directed towards the surface of material whose level is to be determined, a transmitter to transmit pulses of electrical energy to energize selectively each said transducer whereby to cause it to emit at least one shot of acoustic energy at a predetermined frequency, receiver receiving and amplifying electrical energy from said at least one shot regenerated by said transducer from acoustic energy at the same frequency received by the transducer over a subsequent period, the time lapse after a shot before receipt by said receiver of energy regenerated from an echo from said surface being proportional to the distance of the origin of the echo, signal processing means comprising analog to digital converter means to sample repeatedly the output amplitude of the signal from the receiver at defined intervals and to digitize the samples; memory means to store an extended sequence of digitized samples so produced in respect of at least one shot and form therefrom a digital data base file depicting an amplitude/time profile of the received signal with a resolution dependent on the sampling intervals; and computing means programmed to utilize the amplitude profile depicted by the data in said data base to help isolate relative to a time axis a portion of the output signal produced by said at least one shot deemed most probable to correspond to a wanted echo, and to determine a range represented by an echo within said portion of the time axis;

the improvement wherein the transmitter is configured to transmit at least two pulses to the transducer for each ranging operation, so that the latter produces both at least one relatively long shot and at least one relatively short shot, the signal processing means is configured to produce independent echo profile data bases for the short shots and the long shots, and the computing means is programmed to process each data base independently to locate a valid echo, to calculate a confidence factor for any echo so found, and to select the echo with the greater confidence factor if an apparently valid echo is found in both data bases.

8. A system according to claim 7, wherein the computing means is further programmed while processing one long shot to generate a file containing a time varying threshold, and to compare this file repeatedly with the data base file depicting the signal profile both to identify echoes in the latter and the magnitude of such echoes, utilizing successively different criteria, to generate a file containing the summed magnitudes of the echoes located by said repeated comparisons at different locations on the profile, and to select the largest of said summed magnitudes as identifying a point in the signal profile representing a true echo.

9. An acoustic ranging system comprising an electro-acoustic transducer directed towards the surface of material whose level is to be determined; a transmitter to transmit pulses of electrical energy to energize selectively said transducer whereby to cause it to emit at least one shot of acoustic energy at a predetermined frequency; a receiver receiving and logarithmically amplifying electrical energy from said at least one shot regenerated by said transducer from acoustic energy at the same frequency received by the transducer over a subsequent period, the time lapse after a shot before receipt by said receiver of energy regenerated from an echo from said surface being proportional to the distance of the origin of the echo; signal processing means comprising analog-to-digital converter means to sample repeatedly the output amplitude of the signal from the receiver at defined intervals and to digitize the samples; memory means to store an extended sequence of digitized samples so produced in respect of at least one shot and form therefrom a digital database file depicting an amplitude/time profile of the received signal with a resolution dependent on the sampling intervals; and computing means configured by programming means to filter digitally the digital database file and to generate therefrom a time varying threshold file, to compare the amplitude/time profile depicted by the data in said database file with said time varying threshold file, to identify from the results of said comparison relative to a time axis a portion of the output signal produced by said at least one shot deemed most probable to correspond to a wanted echo, and to determine a range represented by an echo within said portion of the time axis; wherein the computing means is further configured by the programming means to alter, prior to said comparison, at least one of the digital database file and the time varying threshold file by direct digital manipulation of selected portions thereof so as selectively to remedy the effect of echo obscuring features of the received signal whilst retaining, in the file or files so modified, information useful in the identification of a wanted echo, to utilize the comparison between the digital database file and the time varying threshold file to produce at least one comparison file of data relating to peaks in the amplitude/time profile, and to examine peaks in the profile represented in the at least one comparison file to determine the peak corresponding to a wanted echo.

* * * * *